United States Patent [19]

Lavin

[11] Patent Number: 5,317,381
[45] Date of Patent: May 31, 1994

[54] PNEUMATICALLY DITHERED RING LASER GYROSCOPE

[75] Inventor: Thomas J. Lavin, Nutley, N.J.

[73] Assignee: Allied-Signal Inc., Morris Township, Morris County, N.J.

[21] Appl. No.: 408,826

[22] Filed: Sep. 18, 1989

[51] Int. Cl.$^5$ .............................................. G01C 19/68
[52] U.S. Cl. ...................................... 356/350; 372/87; 372/94
[58] Field of Search .................... 356/350; 372/94, 58, 372/87

[56] References Cited

U.S. PATENT DOCUMENTS 4,325,033 4/1982 Shutt .............................. 356/350 X Primary Examiner—Vincent P. McGraw
Attorney, Agent, or Firm—Howard G. Massung; Robert A. Walsh

[57] ABSTRACT

A pneumatically dithered ring laser gyroscope features providing an oscillatory motion directly to a segment of the excited gas which serves as the laser photon source. Alternately switching ionizing potential between two cathodes in appropriately designed cavities establishes desired oscillatory gas velocities to effect emitted frequencies within the gyro, thereby permitting the detection of rotational rates below the "lock-in" rate of the undithered gyro.

8 Claims, 2 Drawing Sheets

PNEUMATICALLY DITHERED RING LASER GYROSCOPE

BACKGROUND OF THE INVENTION

This invention relates generally to ring laser gyroscopes (gyros) and more particularly to ring laser gyros which are dithered to reduce the effects of mode locking otherwise referred to as "lock-in."

Ring laser gyroscopes feature a pair of light beams which are counterpropagated around a closed loop path. The two counterpropagating light beams are compared in frequency. When the gyro rotates in inertial space, the two counterpropagating beams see apparently unequal paths. This causes the beams to resonate at two different frequencies. The frequency difference is measured to provide an indication of the direction and rate of rotation of the gyro.

For small rotational rates a phenomenon referred to as mode or frequency locking or "lock-in" occurs. The frequencies of the two counterpropagating light beams lock to each other and the beams resonate together. This creates a dead zone for which no useful gyro output is obtained.

Various arrangements have been employed to avoid or reduce the lock-in phenomenon. One such arrangement features mechanical dithering of the gyro. The entire gyro is mechanically oscillated at a relatively high frequency. This gives the gyro a dynamically varying bias rotation rate which exceeds the threshold input rate or natural lock-in rate of the dead zone. While a mechanical arrangement of the type described accomplishes the desired results, it adds undesirable energy consumption, cost, weight, size and complexity to a system, such as an attitude reference system, employing the gyro. Mechanical dithering also introduces an undesirable source of vibration and noise into the system which may cause problems in the use of other instruments such as accelerometers or the like which are mounted with the gyro in the system.

Optical devices have been inserted into the laser cavities to introduce a bias or asymmetry into the operation of the laser to avoid the aforenoted mode locking. However, a problem arises in the optical approach in that the optical elements increase the number of interfaces between dissimilar materials in the optical path. Each interface tends to be a source of increased light scattering so that the mode locking effect which the optical devices attempt to reduce is actually enhanced. Further, the optical elements themselves, which may include Faraday cells or other like devices, introduce bias errors into the operation of the gyro due to such factors as, for example, asymmetry and random variations in their characteristics due, for example, to temperature variations.

Electrical excitation, or pumping power, for lasing is typically applied to the laser gaseous medium from a direct current supply. A voltage sufficient to sustain a discharge in the medium is applied to electrodes arranged in spaced relation. The discharge, or plasma excitation current, includes a flow of ionized gas between oppositely polarized electrodes in the optical cavity. This plasma flow tends to induce a bias in a ring laser gyro. Therefore, ring laser gyros using direct current excitation typically include a balanced electrode structure wherein two electrodes of one polarity are symmetrically disposed about a single electrode of the opposite polarity. With the arrangement described, two equal and opposite plasma excitation currents are caused to flow and their biases are thereby caused to cancel. The electrical excitation to sustain the plasma excitation currents may be obtained from the supply which varies the voltage so as to dynamically unbalance the currents. A dynamically varying bias in a gyro output, i.e. a dither, may thereby be induced. However, the maximum amount of dither obtainable in this way is too small to be given any practical consideration.

Other dithering schemes have been attempted. One such scheme involves pumping the plasma more vigorously. A linear induction motor is positioned adjacent the laser gain section and pumps the ionized gas unidirectionally. The apparent index of refraction for the counterpropagating light beams is therefore made different by an amount sufficient to avoid mode locking. This arrangement uses large amounts of energy and the requirement for an electromagnetic structure increases the weight of the system. Additionally, in a scheme such as described where a unidirectional bias is induced, no cancellation of systematic errors occurs.

U.S. Pat. No. 4,325,033 issued to Shutt on Apr. 13, 1982 and assigned to Rockwell International Corporation attempts to avoid the disadvantages of the aforenoted dithering schemes. The patented arrangement features a mechanically dithered ring laser gyro in which the effects of mode locking at low rotation rates are reduced by providing an oscillatory flow of the ionized gas in the gain section of the laser. The structure involved features an envelope in which the laser is sealed and includes a pair of closed-end bellows. The bellows are extended and retracted in push-pull relationship to pump the gas so as to create a dynamically varying pressure differential and hence oscillatory gas flow along the bore of the gain section of the laser which induces a corresponding oscillatory bias in the gyro output. Here again, the bellows arrangement adds weight and size to a system using a ring laser gyro and is prone to intolerable inaccuracies for many applications.

The present invention avoids the aforenoted problems by pneumatically establishing an oscillatory motion directly to a segment of the excited gas which serves as the photon source. Alternately switching ionizing potential between two cathodes in appropriately designed cavities establishes the desired oscillatory gas velocities for effecting the emitted frequencies within the gyro thereby permitting the detection of rotational rates below the "lock-in rate" of the otherwise undithered gyro.

SUMMARY OF THE INVENTION

This invention contemplates a pneumatically dithered ring laser gyro which features an arrangement including two cathodes instead of the usual single cathode. By appropriately switching between effective cathodes, the ionized gas which travels between anodes and cathodes is periodically redirected. Knowing the gas velocities at the effective pressures within the gyro, it is possible to establish a pneumatic resonance of effective amplitude to exist between the two cathode volumes. The induced oscillatory motion of the excited gas in the cathode leg of the gyro will, in turn, induce Doppler shifts in frequency for photons emitted from this oscillatory segment of the excited laser ring. Clockwise and counterclockwise directed photons are thereby separated in frequency by being oppositely shifted in direction relative to a detector.

The herein disclosed implementation with potentially high dither rates opens the possibility of alternative means of processing output signals relating to imposed inertial rates. Additionally, by appropriately controlling the duty cycle of the imposed cathode switching, it is possible to advantageously reduce bias drift within the gyro due to net circulating gas flow which results from asymmetries introduced by build tolerances.

DETAILED DESCRIPTION OF THE INVENTION

Figure 1:
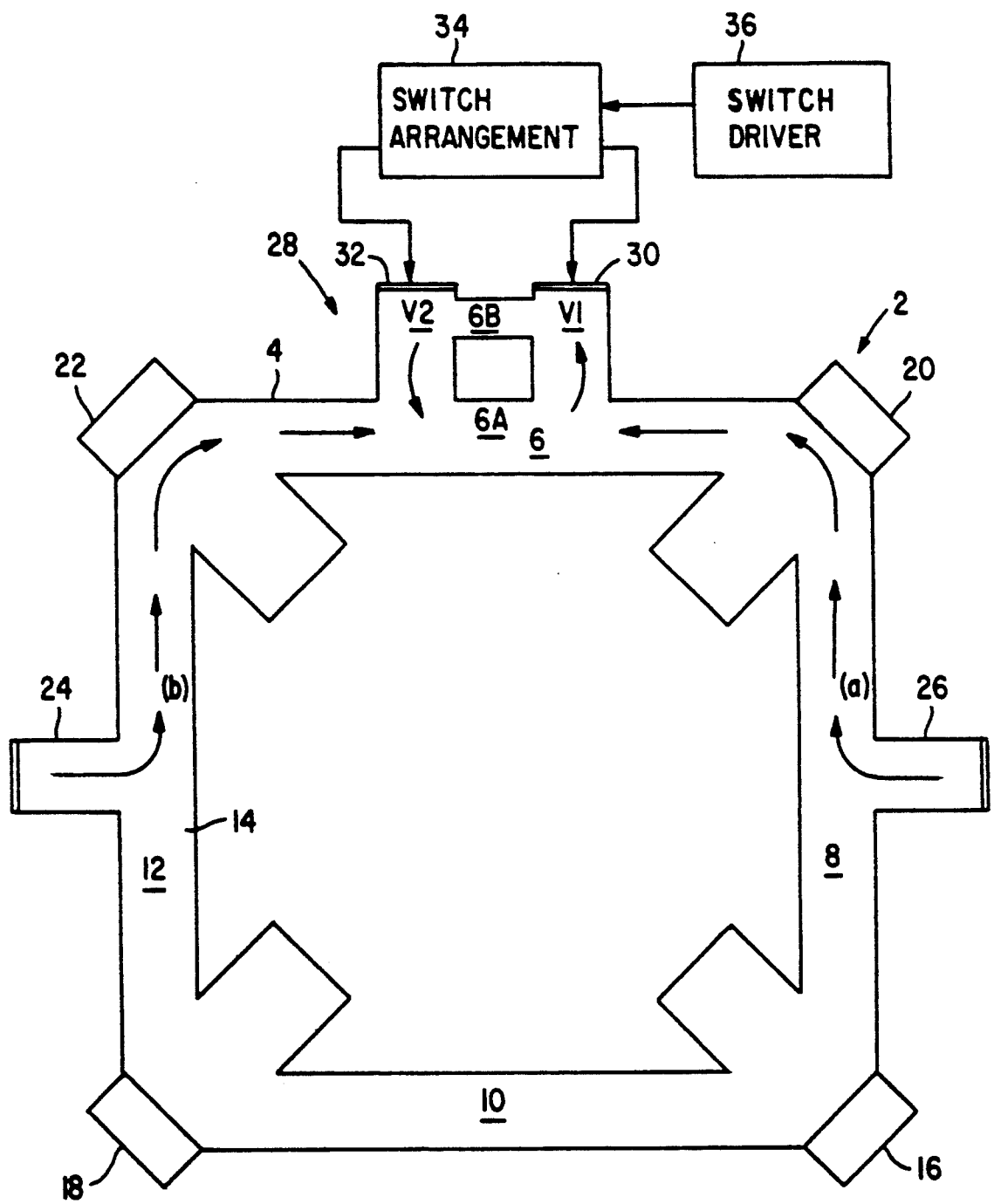
FIG. 1 is a diagrammatic representation showing, for purposes of illustration, a typical four sided ring laser gyro illustrating the invention.

With reference to FIG. 1, a ring laser gyroscope (gyro) is designated by the numeral 2. Gyro 2 has a body 4 which is preferably of ceramic having a low coefficient of thermal expansion. Passageways 6, 8, 10 and 12 in body 4 form a closed cavity 14 for counter-propagating beams of coherent light.

Gyro 2 includes corner mirrors 16 and 18 at one of the extremities of each of the passageways 8 and 12, respectively. A rate read-out prism or detector 20 is disposed at the opposite extremity of passageway 8 and a stabilization read-out prism 22 is disposed at the opposite extremity of passageway 12.

Base 4 forms a sealed envelope containing gas under a low pressure in optical cavity 14. A suitable gas for the purposes intended is the well known mixture of helium and neon. Electrodes are disposed in communication with optical cavity 14 so that an electrical potential sufficient to support plasma excitation and lasing may be maintained in the gas.

Thus, an electrode or anode 24 is disposed in passageway 12 between mirror 18 and stabilization read-out prism 22, and an electrode or anode 26 is disposed in passageway 8 between mirror 16 and rate read-out prism or detector 20.

A dual electrode or cathode arrangement designated generally by the numeral 28 is disposed in passageway 6 between stabilization read-out prism 22 and rate read-out prism 20.

The ring laser gyro so far described, except for cathode arrangement 28, is of the type well known in the art and, accordingly, only as much of the gyro as is required to understand the invention has been herein illustrated and described. In this connection it will be understood that prior art gyros include a single cathode instead of dual cathode arrangement 28 herein shown.

Thus, dual cathode arrangement 28 includes an electrode or cathode 30 and an electrode or cathode 32 in communication with passageway 6. The cavity volume of cathode 30 is designated as V1 and the cavity volume of cathode 32 is designated as V2. The cathode cavities are mutually coupled via common path portions 6A and 6B as shown in FIG. 1.

Cathode 32 is in a cooperative arrangement with anode 26 which communicates with passageway 8, and cathode 30 is in a cooperative arrangement with anode 24 which communicates with passageway 12. In this connection it will be understood that anodes 24 and 26 are disposed about cathode arrangement 28 at locations in optical path 14 which are selected to provide a desired length for the gain section of the laser relative to the length of the entire optical cavity. As is well known in the laser gyro art, the laser gain section is the portion of optical cavity 14 in which electrodes when energized will maintain a discharge in the ionized gas or plasma. Balanced electrical voltages are applied between anodes 24 and 26 and cathode arrangement 28 to provide substantially equal and therefore balanced plasma excitation currents flowing in the laser gain section.

A switch arrangement 34 is connected to each of the cathodes 30 and 32 in cathode arrangement 28 and is driven by a switch driver 36. By appropriately switching between effective cathodes 30 and 32, the ionized gas which travels between anodes 24 and 26 and cathode arrangement 28 can be alternately redirected towards the periodically active cathode volumes V1 or V2 as indicated by arrows (a) and (b) in the Figure. Knowing the gas velocities at the effective pressures within the gyro, it is possible to establish a pneumatic resonance of effective amplitude between the two cathode volumes. An oscillatory motion of the excited gas in the cathode leg of the gyro is induced, and will, in turn, induce Doppler shifts in frequency for photons emitted from this oscillatory segment of the excited laser ring. Clockwise and counterclockwise traveling photons are thereby separated in frequency by being oppositely shifted in direction relative to detector 20.

Figure 2:
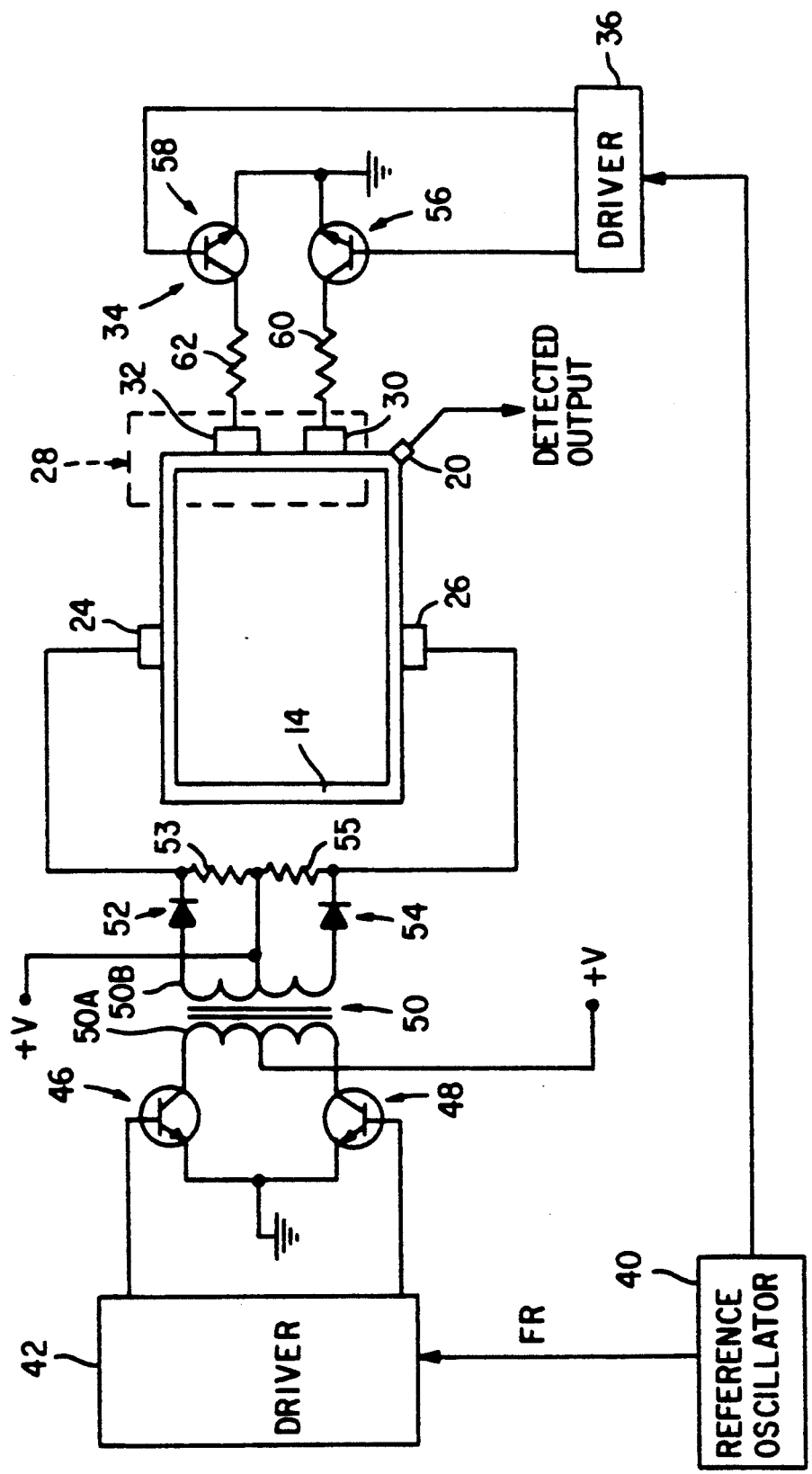
FIG. 2 is a schematic diagram illustrating a preferred embodiment of the invention.

With reference to FIG. 2 a reference oscillator 40 having a frequency FR is connected to a driver 42 and to driver 36, whereby driver 42 is effective for synchronously energizing anodes 24 and 26, and driver 36 is effective for energizing cathodes 30 and 32 as heretofore referred to with reference to FIG. 1.

Driver 42, which may be a conventional flip-flop circuit, is connected to the base of a transistor 46 and to the base of a transistor 48. The emitters of transistors 46 and 48 are connected to ground. The collector of transistor 46 is connected to one leg of a primary winding 50A of a transformer 50 and the collector of transistor 48 is connected to the other leg of primary winding 50A. A positive source of DC voltage (+V) is connected to a center tap of the primary winding of the transformer.

A steering diode 52 is connected to one leg of a secondary winding 50B of transformer 50 and a steering diode 54 is connected to the other leg of winding 50B. Diode 52 is connected to anode 24 and diode 54 is connected to anode 26. A positive source of DC voltage (+V) is connected to a center tap of the secondary winding of the transformer. This voltage is sufficiently high to maintain plasma flow in gyro 2. A resistor 53 is connected to the center tap of secondary winding 50B and is connected between diode 52 and anode 24, and a resistor 55 is connected to the center tap and is connected between diode 54 and anode 26. In the arrangement shown, the output voltage of secondary winding 50B is superimposed on the plasma maintaining voltage.

It will be recognized that steering diode 52 causes anode 24 to receive the sum of the plasma maintaining voltage and the output at secondary winding 50B for the first half of a synchronous cycle, while anode 26 is not similarly overexcited. During the second half of the synchronous cycle, and due to the action of steering diode 54, anode 26 is overexcited and receives the sum of the plasma maintaining voltage and the output of secondary winding 50B, while anode 24 is at the plasma maintaining voltage.

Driver 36, which is of a conventional make-before-break type, is connected to the base of a transistor 56 and to the base of a transistor 58. The emitter of transistor 56 and the emitter of transistor 58 are connected to ground. The collector of transistor 56 is connected through a resistor 60 to cathode 30 in dual cathode arrangement 28 and the collector of transistor 58 is connected through a resistor 62 to cathode 32 in the dual cathode arrangement. Transistors 56 and 58 are included in switch arrangement 34 as shown generally in FIG. 1. A detected output is provided by read-out prism 20.

When anode 24 is overexcited during the first half of the synchronous cycle as aforenoted, cathode 30 is active via transistor 56 which is synchronously driven by driver 36 to be rendered conductive. Similarly, during the second half of the synchronous cycle when anode 26 is overexcited, cathode 32 is active via transistor 58. Thus, the plasma paths are caused to be unequal in length. During the first half cycle the plasma path between anode 24 and cathode 30 is longer than the path between anode 26 and cathode 30. During the second half cycle the path between anode 26 and cathode 32 is longer than the path between anode 24 and cathode 32. The alternating plasma pathlength modulation is accomplished at a rate in accordance with the characteristics of oscillator 40, and which rate is consistent with the pneumatic resonance parameters of dual cathode arrangement 28.

It will be understood that the cavities for cathodes 30 and 32 are designed using conventional pneumatic circuit theory so as to be mutually coupled by common path portions 6A and 6B of the ring laser gyro path. This provides a pneumatic "tank" circuit with characteristics for amplifying the oscillatory displacement amplitude of the synchronously disturbed ionized path. In this regard reference is made to an analogous electrical tank circuit such as described in the text *Electronics For Scientists*, published by W. A. Benjamin, Inc., N.Y., N.Y., 1963.

In regard to the aforementioned pneumatic "tank" circuit, it will be recognized that cathode volumes V1 and V2 operating in conjunction with their mutually coupled path portions 6A and 6B in which pneumatic energy is exchanged form a pneumatically resonant circuit, and hence the "tank" circuit analogy.

From the aforegoing it will be discerned that the synchronous motivating force for the desired plasma dither is provided by the anode supply including driver 42, transistors 46 and 48, transformer 50, and diodes 52 and 54 so as to both maintain the plasma and to provide a push-pull excitation level to the anodes. Since the potential drop within the plasma is nearly constant, the push-pull dithering potential is manifested primarily within the region of the "fall" area of cathodes 30 and 32. Steering of the active cathode is synchronously accomplished by the make-before-break arrangement effected by driver 36 in conjunction with transistors 56 and 58. This arrangement insures that the plasma is never extinguished, but periodically alternates the path-lengths of the gain region with respect to the two anodes 26 and 24. That is to say, with the arrangement shown and described, both of the cathodes 30 and 32 are effective for a short interval, after which only one of the cathodes is effective to redirect the ionized gas as aforenoted. This insures that there will be no lapse in the detecting capabilities of gyro 2 as is, of course, desirable.

It will be further discerned that the physical arrangement of the anodes with respect to the cathodes provides for an alternating but equalized asymmetry to exist for a half-cycle of the dithering frequency (FR) imposed by oscillator 40. By providing a cathode arrangement of sufficiently high pneumatic characteristics, the normally small effective changes in anode potential on plasma drift can be raised to a level sufficient for avoiding "lock-in."

It will now be understood that the present invention eliminates otherwise cumbersome mechanical dither mechanisms used to circumvent laser "lock-in" phenomena by pneumatically applying an oscillatory motion directly to a segment of the excited gas which serves as the photon source. Alternately switching ionizing potential between two cathodes in appropriately designed cavities establishes the desired oscillatory gas velocities to effect the emitted frequencies within the gyro, thereby permitting the detection of rotational rates below the "lock-in" rate of the undithered gyro.

While the invention has been described with reference to a four sided gyro, the invention will work equally as well with other gyro configurations as will now be understood by those skilled in the art.

With the above description of the invention in mind reference is made to the claims appended hereto for a definition of the scope of the invention.

What is claimed is:

1. A ring laser gyro, comprising:
    an envelope for an optical resonant cavity, said envelope containing an active gas medium;
    electrically energizable electrode means for establishing an electrical discharge in the active gas medium to excite a pair of light beams conunterpropagating in an optical resonant cavity, the counterpropagating light beams tending to exhibit mode locking effects;
    the electrically energizable means including a first anode, a second anode, a first cathode in cooperative relation with the first anode and a second cathode in cooperative relation with the second anode, means for exciting the first and second anodes, and means for exciting the first and second cathodes;
    the first and second anodes and the first and second cathodes being excited by their respective exciting means so that during alternate halves of a synchronous cycle the effectivity of one of said first and second cathodes is switched, whereby the active gas medium plasma path between one of the first and second anodes and the cathode in cooperative relation therewith is different than the plasma path between the other of the first and second anodes and the cathode in cooperative relation therewith;
    pneumatic means for synchronously inducing an oscillatory flow of the active gas medium in the optical resonant cavity for reducing the mode locking effects; and
    means for generating an output signal for said gyro by measuring the difference in frequency of the counterpropagating light beams.

2. A ring laser gyro as described by claim 1, wherein the pneumatic means includes:
    the first cathode arranged in a cavity having a first pneumatic volume;
    the second cathode arranged in a cavity having a second pneumatic volume; and
    the first and second pneumatic volumes being mutually coupled by first and second portions of the envelope containing the active gas medium, and in which first and second envelope portions pneumatic energy is exchanged to provide a pneumatically resonant circuit.

3. A ring laser gyro as described by claim 2, wherein the means for exciting the first and second anodes includes:

means for providing a first electrical output at a level for maintaining active gas medium plasma flow;

means for providing a second electrical output;

means for superimposing the second electrical output on the first electrical output and for providing a superimposed output; and means connected to the superimposing means and to the first and second anodes for overexciting one of the first and second anodes with the superimposed output during a first alternate half of the synchronous cycle and for overexciting the other of the first and second anodes with the superimposed output during a second alternate half of the synchronous cycle.

4. A ring laser gyro as described by claim 3, wherein the means for providing a first electrical output at a level for maintaining active gas medium plasma flow includes:

oscillator means for providing an output at a frequency commensurate with the pneumatically resonant circuit;

electrical output means; and driver means connected to the oscillator means and to the electrical output means and responsive to the output at a frequency commensurate with the pneumatically resonant circuit for driving the electrical output means to provide the first electrical output.

5. A ring laser gyro as described by claim 4, wherein the means for exciting the first and second cathodes includes:

switching means connected to the first and second cathodes;

other driver means connected to the switching means; and the other driver means connected to the oscillator means and responsive to the output at a frequency commensurate with the pneumatically resonant circuit for driving the switching means, with the switching means thereupon switching the cathode effectivity between the first and second cathodes so that one of the first and second cathodes is effective during the first alternate half of the synchronous cycle and the other of said cathodes is effective during the second alternate half of said cycle, whereby the direction of flow of the active gas medium is redirected at a frequency commensurate with the frequency of the output from the oscillator means to provide the pneumatically resonant circuit.

6. A ring laser gyro as described by claim 5, wherein: the other driver means has make-before-break characteristics, whereby the switching means is driven for switching the cathode effectivity so that both of the first and second cathodes are effective for a short interval after which only one of said cathodes is effective to insure against an interruption in the output signal.

7. A ring laser gyro, comprising:

a base having a resonant cavity therein, with said cavity filled with an active gas medium;

electrically energizable electrode means for establishing an electrical discharge in said active gas medium for exciting a pair of light beams counterpropagating in said optical resonant cavity, wherein said light beams tend to exhibit mode locking effects and wherein said electrode means defines a gain section of the optical cavity;

means for generating an output signal for said gyro by measuring a difference in the frequencies of said light beams;

pneumatic means for synchronously inducing an oscillatory flow of the active gas medium along said gain section of the optical cavity whereby the mode locking effects are reduced; and said pneumatic means including the electrically energizable electrode means arranged with a first cavity having a first pneumatic volume and with a second cavity having a second pneumatic volume, and the first and second pneumatic volumes being mutually coupled by first and second portions of the gain section of the optical cavity, and in which first and second portions pneumatic energy is exchanged to provide a pneumatically resonant circuit.

8. A ring laser gyro, comprising:

an envelope for an optical resonant cavity said envelope containing an active gas medium;

electrically energizable electrode means for establishing an electrical discharge in the active gas medium to excite a pair of light beams counterpropagating in the optical resonant cavity, the counterpropagating light beams exhibiting mode locking effects;

pneumatic means for synchronously inducing an oscillatory flow of the active gas medium in the optical resonant cavity and including a first cavity having a first pneumatic volume and a second cavity having a second pneumatic volume arranged with the electrode means, and the first and second pneumatic volumes being mutually coupled by first and second portions of the envelope containing the active gas medium, and in which first and second envelope portions pneumatic energy is exchanged to provide a pneumatically resonant circuit for reducing the mode locking effects; and means for generating an output signal for said gyro by measuring the frequency of the counterpropagating light beams.

* * * * *